A. E. SCHENCK.
STEERING GEAR FOR TRACTORS.
APPLICATION FILED JUNE 12, 1914.

1,163,862.

Patented Dec. 14, 1915.
2 SHEETS—SHEET 2.

Witnesses:
Elmer R. Shipley.
Geo Johnson.

Arthur E. Schenck
Inventor
by James W. See
Attorney

UNITED STATES PATENT OFFICE.

ARTHUR E. SCHENCK, OF BETHANY, OHIO.

STEERING-GEAR FOR TRACTORS.

1,163,862.  Specification of Letters Patent.  Patented Dec. 14, 1915.

Application filed June 12, 1914. Serial No. 844,804.

*To all whom it may concern:*

Be it known that I, ARTHUR E. SCHENCK, a citizen of the United States, residing at Bethany, Butler county, Ohio, have invented certain new and useful Improvements in Steering-Gear for Tractors, of which the following is a specification.

This invention relates to steering-gear for automobiles of that class designed for the pulling of trailing loads and generally referred to as tractors, though the invention is applicable to automobiles carrying their own loads direct.

The present improvements in tractors aim at superior facility in maneuvering.

The invention will be readily understood from the following description taken in connection with the accompanying drawings in which:—

Figure 1:
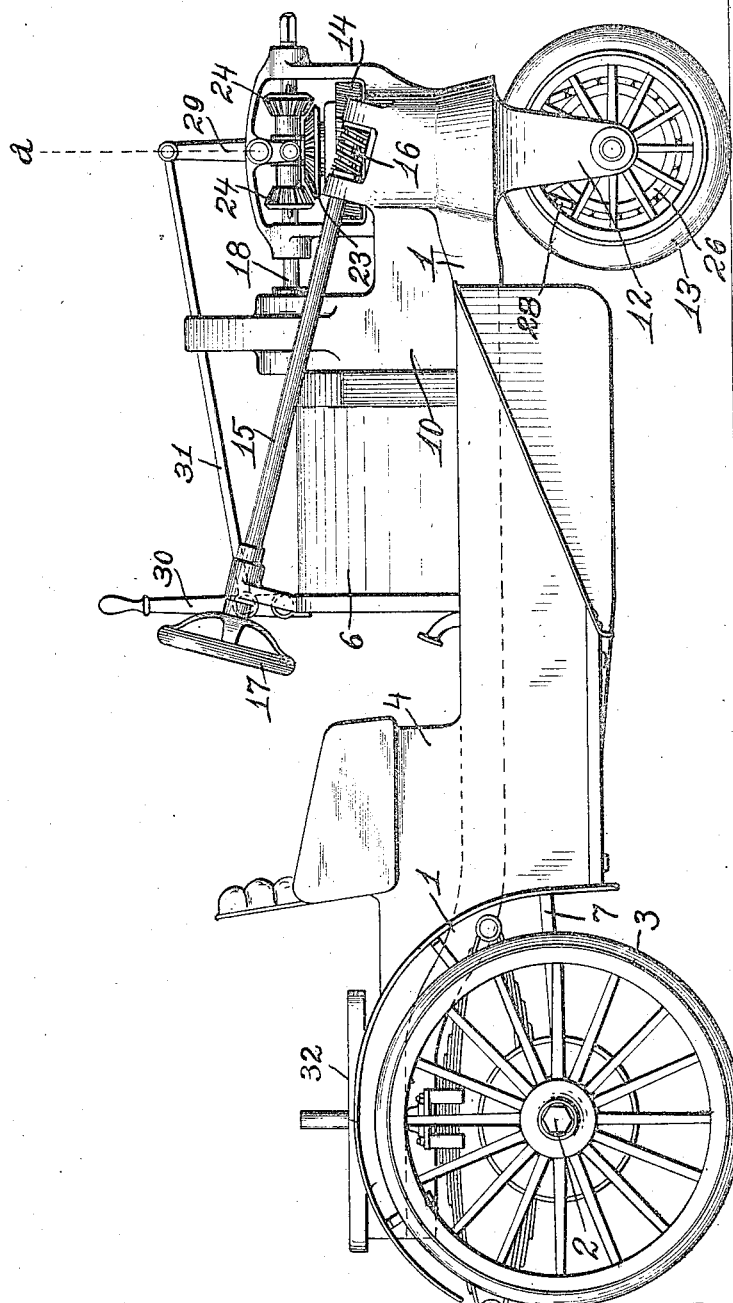
Figure 2:
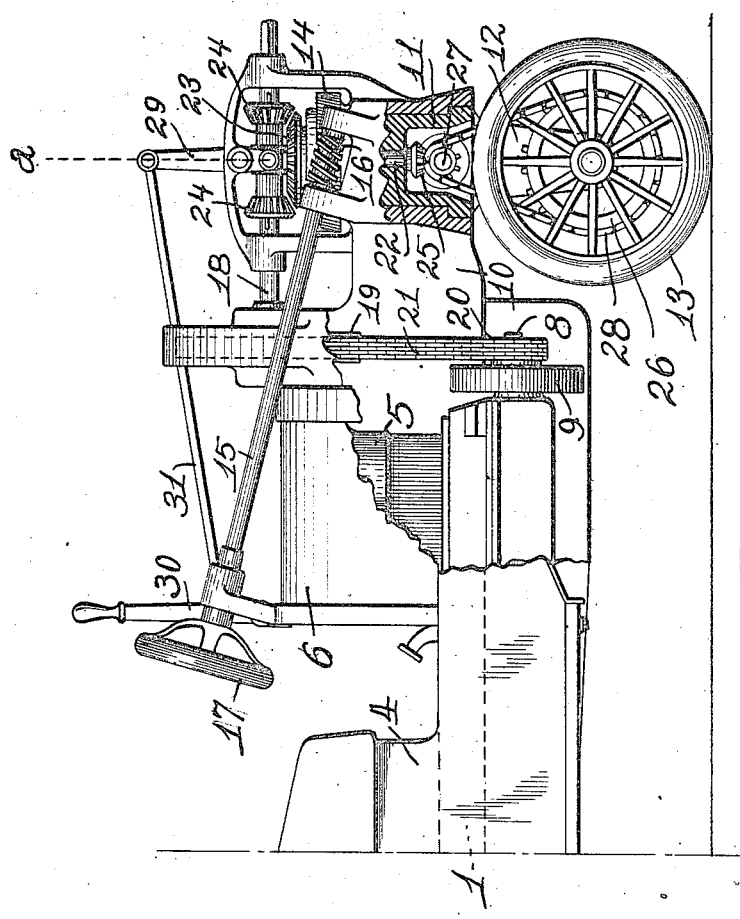
Figure 3:
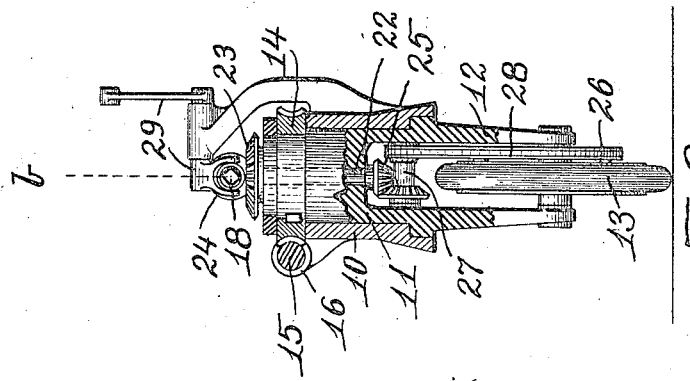

Figure 1 is a side elevation of a tractor forming an exemplification of my invention; Fig. 2 is a similar side elevation of the forward portion of the tractor, some parts appearing in vertical longitudinal section in the plane of line *b* of Fig. 3; and Fig. 3 a vertical transverse section of parts in the plane of line *a* of Figs. 1 and 2.

In the drawings:—1, indicates the general frame of the machine; 2, the rear axle, to which the driving power is applied; 3, the rear wheels, these wheels forming the traction wheels; 4, the body; 5, the engine; 6, the hood over the engine; 7, the transmission-shaft, between the engine and the rear axle; 8, the engine shaft; 9, the engine flywheel, all of the parts thus far referred to being, or adapted to be, the same as is usual in automobiles, and subject to all of the usual modifications in those parts; 10, a housing carried rigidly at the forward portion of the general frame; 11, a large vertical spindle journaled in a bearing disposed at the transverse center of the forward portion of housing 10; 12, a fork carried by the lower end of spindle 11; 13, a traction wheel journaled in this fork; 14, a worm-gear fast on the upper end of spindle 11; 15, a steering-shaft journaled in the forward portion of the machine; 16, a worm mounted on this shaft and engaging the worm-wheel; 17, a hand-wheel on the steering-shaft, within reach of the driver; 18, a counter-shaft journaled in housing 10, above the axis of spindle 11 and extending fore and aft of the forward portion of the machine; 19, a sprocket wheel on this counter-shaft; 20, a sprocket-wheel on the engine-shaft; 21, a chain connecting the two sprocket-wheels; 22, a vertical transmission shaft journaled axially in spindle 11; 23, a bevel-gear fast on the upper end of this shaft; 24, a pair of bevel-gears unified in spool form, and splined to counter-shaft 18 and adapted to engage, alternatively, with bevel-gear 23; 25, a bevel-gear fast on the lower end of vertical transmission shaft 22; 26, a sprocket-wheel fast with wheel 13; 27, a horizontal shaft journaled in spindle 11 and extending crosswise of the machine, this shaft being bevel-geared to shaft 22 by being provided with a bevel-gear engaging bevel-gear 25; 28, a chain connecting sprocket-wheel 26 with a sprocket-wheel fast on shaft 27; 29, a shifting-lever pivoted on the front part of the machine and adapted, by its oscillation, to put either of bevel-gears 24 into engagement with bevel-gear 23; 30, a hand-lever within reach of the driver; 31, a link connecting levers 29 and 30; and 32, a hitch mounted on the rear end of the machine and adapted to receive the attaching device of the trailing vehicle which the tractor is to draw.

Looking at Fig. 1, the general structure is to be provided with all of the usual accessories of an automobile and, indeed, the general structure differs from an ordinary automobile only in that there is but a single front wheel instead of a pair of front wheels, which feature, in itself, is not new.

Hitch 32 offers means by which a trailing vehicle may be attached to the tractor, and this hitch may be of any character suited for the purpose. While the load to be dealt with might be carried directly upon the tractor it is the aim, as before explained, to utilize the machine as a tractor for pulling a trailing vehicle carrying the load.

Counter-shaft 18 is driven from the engine-shaft, and when bevel-gears 24 are in the position indicated, the counter-shaft turns idly and no power is transmitted from it. This counter-shaft may, if desired, be utilized in cranking the machine.

Assuming the tractor to be proceeding in a general straight line of travel, and that bevel-gears 24 are in the idle position illustrated, steering-wheel 17 serves in turning spindle 11 and wheel 13 and in effecting the steering of the vehicle. Assume, now, that the tractor is drawn up alongside a curbstone, by being steered in the manner usual with automobiles, and assume further, that in desiring to leave this position and get out into the street, the driver finds obstructions at the front and in the rear so that he could not get away from the curbstone in the manner usual with automobiles. Under these conditions he could not possibly leave his position if the construction were as usual, for usual construction require an advance or retreat of the general machine in maneuvering. But in the present case the driver would turn the fork of wheel 13 so as to bring the axis of that wheel at, say about parallel with the curbstone. He would then shift the bevel-gears 24 so that bevel-gear 23 would be engaged by that one of the bevel-gears suited to the turning of wheel 13 in the direction to carry the forward end of the machine away from the curbstone. Under these conditions wheel 13 would become a power driven wheel, and the rear wheels would be idle, and the front end of the machine would swing around out from the curb on a vertical axis located at the rear of the machine. When the machine has thus been given the desired direction, the power may be cut off from the front wheel, in an obvious manner, and power may be applied to the rear wheels and the travel of the machine proceeded with in the usual manner. It is obvious that in the open, by leaving the rear wheels disconnected from the power, by means of the usually provided clutch and by applying the power to the front wheel, the machine may make complete circles of a diameter represented by twice its own length, and in either direction. It is therefore seen that the machine may be as perfectly maneuvered as an ordinary horse-drawn vehicle in which the horses may be turned at right angles to the general length of the vehicle preliminary to the making of a turn on the vertical axis at the rear of the machine.

The maneuvering motion designed for the machine will preferably be a very slow one with no regard for the general speed employed in the forward travel of the machine, though, of course, the gearing may be so proportioned that the transverse movement of the forward portion of the machine as effected by wheel 13 when power is applied to it may be at substantially the same rate as the general advance of the machine, and in such case the machine may, in general forward travel have a tractive force of the rear wheels supplemented by the tractive force of the front wheel. But, whatever be the proportioning of the gearing in that respect, it is manifest that the tractive force of the front wheel may be utilized while no force is being applied to the rear wheel, and this, regardless of whether the machine be travelling in a straight line or be merely making a maneuvering turn.

I have assumed a case in which the tractor is near a curbstone and between obstructions to the front and rear, conditions under which a tractor with ordinary steering gear could not move at all until the obstructions were removed, and conditions under which a tractor provided with my improved steering gear could move readily away from the curb and out into the open. But, now, assume that the tractor is in the open and that it is desired to turn sharply to the right. The front traction wheel is to be turned to the proper extent, even till its axis is at right angles to the axis of the rear wheels. The gears 24 are now to be shifted so as to cause the front traction wheel to rotate in such direction as to swing the front of the vehicle to the right, the rear portion of the machine being idle and acting as a mere pivot for the swinging motion. If, however, after the front of the vehicle has been thus swung to the right to some extent there be a change of mind calling for the turning of the tractor to the left instead of to the right, gears 24 are to be shifted so as to reverse the direction of rotation of the steering wheel, whereupon the front of the tractor reverses its direction and swings to the left, pivoting on the rear portion of the vehicle. Sharp turns may thus be made in either direction and the direction of turning may be changed at will, owing to the fact that the fork carrying the front traction wheel carries with it mechanism of transmission for giving motion to that wheel and reversing mechanism for determining the direction of motion of that wheel. This maneuvering capacity is far superior to that existing in any tractor steering gear within my knowledge.

It is to be understood that the construction particularly illustrated and described constitutes but a single exemplification of my invention. I have sought merely to explain the principle of my invention and the best manner in which I at present contemplate the embodiment of that principle.

I claim:—

A tractor comprising a frame, a rear axle carried by the rear portion of said frame, traction wheels on said rear axle, an engine carried by the forward portion of the frame, mechanism for transmitting propelling power from the engine to said rear traction wheels, a housing carried by the forward portion of the frame and provided with a vertical bore at the center of width of the frame, a spindle fitting said vertical bore and provided with an axial vertical bearing, a vertical transmission shaft journaled in said bearing, a fork integrally connected with the foot of said spindle, a traction-wheel journaled in said fork, a worm-gear fast on the upper end of the spindle, a worm journaled in the housing and engaging the worm-gear, a steering-shaft journaled in the frame and connected with said worm, a horizontal shaft journaled in the spindle between the traction-wheel in the fork and the lower end of said vertical transmission shaft, bevel-gearing connecting said vertical shaft and horizontal shaft, a transmission-chain connecting the horizontal shaft with the traction-wheel journaled in the fork, a bevel-gear fast on the upper end of said vertical transmission-shaft, a horizontal shaft journaled in the frame above said last-mentioned bevel-gear, means for transmitting motion from the engine to said horizontal shaft in one direction, a pair of connected bevel-gears splined on said horizontal shaft and adapted to engage said bevel-gear one at a time or to be both disengaged therefrom, and means for shifting said pair of connected bevel-gears so that either one or neither may engage the bevel-gear on the upper end of the vertical transmission shaft, combined substantially as set forth.

ARTHUR E. SCHENCK.

Witnesses:
 GEO. JOHNSON,
 M. S. BELDEN.